UNITED STATES PATENT OFFICE.

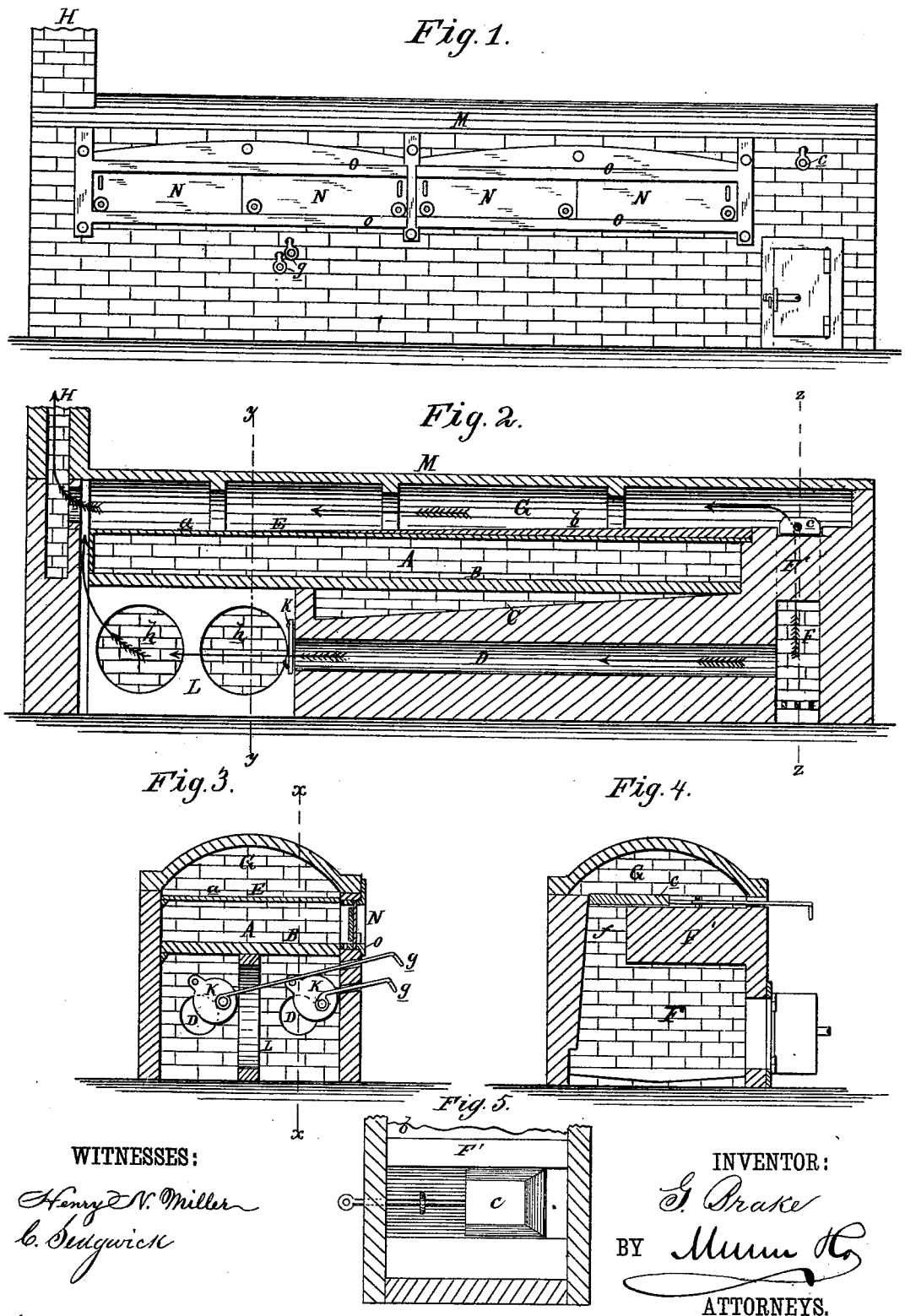

GEORGE BRAKE, OF LANSING, MICHIGAN.

BAKER'S OVEN.

SPECIFICATION forming part of Letters Patent No. 233,469, dated October 19, 1880.

Application filed February 20, 1880.

*To all whom it may concern:*

Be it known that I, GEORGE BRAKE, of Lansing, in the county of Ingham and State of Michigan, have invented a new and useful Improvement in Bakers' Ovens, of which the following is a specification.

Figure 1 is a front elevation of the oven. Fig. 2 is a longitudinal sectional elevation of the same on line $x\ x$, Fig. 3. Fig. 3 is a transverse sectional elevation of the same on line $y\ y$, Fig. 2. Fig. 4 is a transverse sectional elevation of the same on line $z\ z$, Fig. 2. Fig. 5 is a top view of the fire-place, showing the damper.

Similar letters of reference indicate corresponding parts.

The object of this invention is to provide a baker's oven that is simple and cheap in construction and economical and efficient in operation.

The invention is an improvement on the baker's oven for which Letters Patent No. 215,088 were granted to me May 6, 1879.

In the drawings, A represents the baking part of the oven, provided with a floor or bottom, B, of stone or other refractory substance that will withstand the heat.

C represents a layer or mass of brick, rubble, plaster, or other non-conducting or poorly-conducting material, filled in or built up between the floor or bottom B and the lower heating-flues, D D.

E is the top of the baking part of the oven, said top consisting of an iron plate, $a$, fitting tightly to prevent the ingress of smoke, gases, or ashes into the said baking part, and of a covering of plaster or other non-conducting substance, $b$, placed on the iron plate $a$, and covering it for most of its length, said plaster $b$ being about eight inches thick, or thereabout, at the point nearest the fire-place, and sloping down to an inch or less at a distance of about fifteen feet from the fire-place end.

By means of the layer C, of non-conducting material, beneath the floor B, and of the non-conducting material $b$ of the top E, the temperature of the baking part A of the oven is equalized, never baking too quickly, and always baking evenly and sufficiently fast.

F represents the fire-place, covered by a damper, $c$, on its top, for regulating or determining the direction in which the heat and products of combustion shall pass from said fire-place F; and F' represents the division-wall between the fire-place F and the oven A.

When the damper $c$ is withdrawn the principal portion of the products of combustion will pass over the top of the baking part A of the oven, through the flue G to the smoke-stack H, and when the damper $c$ is closed over the opening $f$ of the fire-place F, as shown in Fig. 4, the products of combustion will pass to the smoke-stack H, through the heating-flues D, under the non-conducting layer C, that is beneath the floor B.

Over the extreme ends of the flues D are fitted the dampers K, provided with adjusting-rods $g$, for regulating the draft through said flues, and the division-wall L, extending from between the ends of the flues D to the smoke-stack H, is provided with ample openings $h$, for the passage of the smoke and gases.

The oven-roof M is properly supported, and the whole front of the baking part of the oven is opened or closed by doors N, which slide in grooved plates O, that are placed above and below the said doors N.

In ordinary bakers' ovens the fire must be drawn before putting in the dough, lest the bread be injured by the smoke, gases, and floating ashes, and hence such ovens quickly cool; but it will be seen that by the devices herein shown the fire may be maintained during the baking without fear of injuring the bread, and by keeping up a constant fire much more work can be done in this oven in a given time than with ovens commonly in use.

When the baking part of the oven herein shown and described becomes heated the masses of non-conducting materials placed above and below the said baking part serve as storers of heat and cause an equable and long-continued heat to be diffused through the entire oven.

Having thus described my invention, I claim as new and desire to secure by Letters Patent—

The combination, with the baking part A of the oven and the flues D G, of the non-conducting material $b$ C, gradually increased in thickness toward the fire-place to equalize the heat, as described.

GEORGE BRAKE.

Witnesses:
CHARLES F. PINE,
W. K. PRUDDEN.